(12) United States Patent
Jagannath et al.

(10) Patent No.: US 8,280,915 B2
(45) Date of Patent: Oct. 2, 2012

(54) BINNING PREDICTORS USING PER-PREDICTOR TREES AND MDL PRUNING

(75) Inventors: Mahesh Jagannath, Shrewsbury, MA (US); Chitra Bhagwat, Wobum, MA (US); Joseph Yarmus, Groton, MA (US); Ari W. Mozes, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 11/344,185

(22) Filed: Feb. 1, 2006

(65) Prior Publication Data

US 2007/0185896 A1    Aug. 9, 2007

(51) Int. Cl.
*G06F 7/00* (2006.01)
*G06F 17/30* (2006.01)

(52) U.S. Cl. ...................................................... 707/797
(58) Field of Classification Search .............. 707/6, 106, 707/101, 102, 999.006, 999.102, 999.101, 707/797

See application file for complete search history.

(56) References Cited

U.S. PATENT DOCUMENTS

| | | | |
|---|---|---|---|
| 6,247,016 B1 * | 6/2001 | Rastogi et al. | 707/101 |
| 6,546,389 B1 * | 4/2003 | Agrawal et al. | 707/6 |
| 2003/0061213 A1 * | 3/2003 | Yu et al. | 707/7 |
| 2004/0002981 A1 * | 1/2004 | Bernhardt et al. | 707/100 |
| 2007/0011135 A1 * | 1/2007 | Chitgupakar et al. | 707/1 |

OTHER PUBLICATIONS

Cecile Favre et al., Bitmap Index-Based Decision Trees, (http://www.springerlink.com/content/u0r8qvkpwa2wu8k6/), May 2, 2005, Springer Berlin, vol. 3488/2005.*
Petri Kontkanen et al., Efficient Computation of Stochastic Complexity, (http://web.archive.org/web/20030331082853/http://cosco.hiit.fi/Articles/aistats03.pdf), Mar. 21, 2003.*

* cited by examiner

*Primary Examiner* — Alexey Shmatov
(74) *Attorney, Agent, or Firm* — Murphy & King, P.C.

(57) ABSTRACT

Binning of predictor values used for generating a data mining model provides useful reduction in memory footprint and computation during the computationally dominant decision tree build phase, but reduces the information loss of the model and reduces the introduction of false information artifacts. A method of binning data in a database for data mining modeling in a database system, the data stored in a database table in the database system, the data mining modeling having selected at least one predictor and one target for the data, the data including a plurality of values of the predictor and a plurality of values of the target, the method comprises constructing a binary tree for the predictor that splits the values of the predictor into a plurality of portions, pruning the binary tree, and defining as bins of the predictor leaves of the tree that remain after pruning, each leaf of the tree representing a portion of the values of the predictor.

21 Claims, 9 Drawing Sheets

DECISION TREE

WILL A CUSTOMER RESPOND TO A CREDIT CARD PROMOTION?

| ROW 401 | AGE 1 | INCOME 297 | RESPONSE N | • • • |
| ROW 402 | AGE 2 | INCOME 427 | RESPONSE N | • • • |
| ROW 403 | AGE 3 | INCOME 215 | RESPONSE N | • • • |
| ROW 404 | AGE 1 | INCOME 330 | RESPONSE N | • • • |
| ROW 405 | AGE 5 | INCOME 694 | RESPONSE Y | • • • |
| ROW 406 | AGE 1 | INCOME 486 | RESPONSE N | • • • |
| ROW 407 | AGE 2 | INCOME 195 | RESPONSE N | • • • |
| ROW 408 | AGE 4 | INCOME 376 | RESPONSE N | • • • |
| ROW 409 | AGE 3 | INCOME 700 | RESPONSE Y | • • • |

| BITMAP 450 | AGE | 1 | 100101000... |
| BITMAP 451 | AGE | 2 | 010000100... |
| BITMAP 452 | AGE | 3 | 001000001... |
| BITMAP 453 | AGE | 4 | 000000010... |
| BITMAP 454 | AGE | 5 | 000010000... |

Fig. 5

```
FUNCTION ORA_FI_DECISION_TREE_HORIZ(
        horiz_cursor     IN  SYS_REFCURSOR,
        impurity_metric  IN  VARCHAR2 DEFAULT NULL,
        term_max_depth IN  NUMBER DEFAULT NULL,
        term_minrec_split   IN  NUMBER DEFAULT NULL,
        term_minpct_split   IN  NUMBER DEFAULT NULL,
        term_minrec_node  IN  NUMBER DEFAULT NULL,
        term_minpct_node  IN  NUMBER DEFAULT NULL,
        cost_matrixIN  SYS_REFCURSOR DEFAULT NULL,
        priors           IN  SYS_REFCURSOR DEFAULT NULL
) RETURN TABLE OF ROW (
        PARENTNODE   NUMBER,
        NODE      NUMBER,
        SPLITNUMBER  NUMBER,
        SPLITVAL_SUPP   NUMBER,
        ATTRNAME     VARCHAR2(30),
        LOWVAL_MEANNUMBER,
        HIGHVAL_DEV_SUPP  NUMBER,
        ATTRVAL_TGTVAL VARCHAR2(4000))
```

Fig. 6

```
SELECT *
FROM TABLE(ORA_FI_DECISION_TREE_HORIZ(
    CURSOR(SELECT TO_CHAR(PROMO_SUBCATEGORY),
  PROMO_ID,
            PROMO_NAME, PROMO_CATEGORY, PROMO_COST
      FROM PROMOTIONS),
    'TREE_IMPURITY_GINI', 19,0,0,0,0,NULL))
```

Fig. 7

```
BEGIN
  DBMS_DATA_MINING.CREATE_MODEL(
    model_name          => 'DT_model',
    mining_function     => dbms_data_mining.classification,
    data_table_name     => 'promotions',
    case_id_column_name => null,
    target_column_name  => 'promo_subcategory',
    settings_table_name => 'DT_settings');
END;
/
```

BINNING PREDICTORS USING PER-PREDICTOR TREES AND MDL PRUNING

BACKGROUND OF THE INVENTION

1. Field of the Invention

The present invention relates to a system, method, computer program product, and database statement for building decision trees in a database system.

2. Description of the Related Art

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated by one or more data analysis algorithms. Initially, the models are "untrained", but are "trained" by processing training data and generating information that defines the model. The generated information is then deployed for use in data mining, for example, by providing predictions of future behavior based on specific past behavior.

One important form of data mining model is the decision tree. Decision trees are an efficient form for representing decision processes for classifying entities into categories or constructing piecewise constant functions in nonlinear regression. A tree functions in an hierarchical arrangement; data flowing "down" a tree encounters one decision at a time until a terminal node is reached. A particular variable enters the calculation only when it is required at a particular decision node and only one variable is used at each decision node.

Classification is a well-known and extensively researched problem in the realm of Data Mining. It has found diverse applications in areas of targeted marketing, customer segmentation, fraud detection, and medical diagnosis among others. Among the methods proposed, decision trees are popular for modeling data for classification purposes. The primary goal of classification methods is to learn the relationship between a target attribute and many predictor attributes in the data. Given instances (records) of data where the predictors and targets are known, the modeling process attempts to glean any relationships between the predictor and target attributes. Subsequently, the model is used to provide a prediction of the target attribute for data instances where the target value is unknown and some or all of the predictors are available.

Some of the problems in the classification (or generally in machine learning) process arise from noisy and/or irrelevant predictors, very high-cardinality (number of distinct values) predictors etc. Noisy or irrelevant predictors can often times mask the real predictors, resulting in useless, or worse, misleading models. High-cardinality categorical predictors can impose significant computational demands and also result in over-fitting; a problem where the models learn all the quirks in the data used for learning but generalize very poorly and are useless for other instances of data.

Various approaches have been researched and proposed to deal with noisy predictors. Most of these involve some form of pre-filtering based on relevance. For dealing with high-cardinality predictors some form of discretization or binning is generally employed. These schemes more often than not result in some loss of information. A need arises for a technique by which binning can be performed that provides useful models, but which reduces the information loss of the model and reduces the introduction of false information artifacts.

SUMMARY OF THE INVENTION

The present invention performs binning that provides useful models, but which reduces the information loss of the model and reduces the introduction of false information artifacts.

In one embodiment of the present invention, a method of binning data in a database for data mining modeling in a database system, the data stored in a database table in the database system, the data mining modeling having selected at least one predictor and one target for the data, the data including a plurality of values of the predictor and a plurality of values of the target, the method comprises constructing a binary tree for the predictor that splits the values of the predictor into a plurality of portions, pruning the binary tree, and defining as bins of the predictor leaves of the tree that remain after pruning, each leaf of the tree representing a portion of the values of the predictor.

In one aspect of the present invention, the binary tree may be constructed by recursively computing joint counts of predictor and target values, finding a split point for a node for a portion of the values of the predictor, computing a cost of representing the split node in the tree, splitting the portion of the values of the predictor to form two new portions of the values of the predictor, and computing a cost of finding the split. The tree may be pruned by, for each child of each split node of the tree, recursively determining a cost of not pruning the tree up to the split node as a cost to represent sub-trees of the split node plus a cost to represent the split node and pruning the tree up to the split node if the cost of not pruning the tree up to the split node is greater than a cost of representing the split node in the tree or the tree exceeds a pre-defined depth. The split point may be at a value of the predictor having a lowest Gini index value of the portion of the values of the predictor. A cost of representing the split node in the tree may be computed using a composite code including tree structure components plus an approximation to the stochastic complexity of the target values in the parent and child nodes. The stochastic complexity of a dataset is the shortest possible length for the data using a fixed model class.

In one embodiment of the present invention, a method of generating a decision tree model comprises generating a plurality of bitmaps in a database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table, binning values of at least one predictor, counting predictor-target pairs for each combination of binned predictor value and target value using the bitmaps, determining a splitter value for the data in the database table using the counts of the predictor-target pairs so as to split the data in the database table into a plurality of child nodes, each child node comprising a portion of the data in the database table, generating child bitmaps for the data in each child node, and recursively counting predictor-target pairs for each child node using the bitmaps, determining a splitter value for the data in each child node so as to split each child node into a plurality of new child nodes, and generating child bitmaps for the data in each new child node, whereby a decision tree model is formed.

In one aspect of the present invention, the values of the predictor may be binned by constructing a binary tree for the predictor that splits the values of the predictor into a plurality of portions, pruning the binary tree, and defining as bins of the predictor leaves of the tree that remain after pruning, each leaf of the tree representing a portion of the values of the predictor. The binary tree may be constructed by recursively computing joint counts of predictor and target values, finding a split point for a node for a portion of the values of the predictor, computing a cost of representing the split node in the tree, splitting the portion of the values of the predictor to form two new portions of the values of the predictor, and computing a cost of finding the split. The tree may be pruned by, for each child of each split node of the tree, recursively determining a cost of not pruning the tree up to the split node as a cost to represent sub-trees of the split node plus a cost to represent the split node and pruning the tree up to the split node if the cost of not pruning the tree up to the split node is greater than a cost of representing the split node in the tree or the tree exceeds a predefined depth. The split point may be at a value of the predictor having a lowest Gini index value of the portion of the values of the predictor. A cost of representing the split node in the tree may be computed using a composite code including tree structure components plus an approximation to the stochastic complexity of the target values in the parent and child nodes.

In one aspect of the present invention, the predictor-target pairs may be counted by, for each predictor value and each target value, intersecting a bitmap for the predictor value and a bitmap for the target value and counting intersections of the predictor value and the target value. The bitmaps may be sorted by predictor and predictor value and target and target value. The decision tree model may be pruned. The decision tree model may be pruned by walking the decision tree model and using a Minimum Description Length based pruning approach to trim off leaves and branches of the decision tree model. The predictor-target pairs may be counted by, for each predictor value and each target value, intersecting a bitmap for the predictor value and a bitmap for the target value and counting intersections of the predictor value and the target value. The bitmaps may be sorted by predictor and predictor value and target and target value.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

The present invention introduces a new SQL table function that encapsulates the concept of creating a decision tree based on a dataset that is the input from a query. This table function takes the input dataset along with some user-configurable information, and it directly produces a decision tree. The tree can then be used to understand the relationships in the data as well as to score new records.

The new table function is implemented inside the Relational Database Management System (RDBMS) by program code that supports this new SQL table function. Integrating the process of building decision trees inside the RDBMS enables leveraging of many of the database's strengths, such as memory management, parallel execution, and recursive execution. Providing a simple SQL interface via a specialized table function makes the integration of data mining into the database far simpler.

The SQL table function is an improvement over the use of standard SQL. It simplifies the query, but more importantly it simplifies the query optimization stages by making it explicit what type of operation is being processed. It enables the decision tree build process to leverage scalable, efficient, and robust database processing with a very simple interface.

Another advantage is that this method doesn't have to incur the expense, management, and security issues of moving the data to a specialized mining engine.

A decision tree is represented as a directed acyclic graph consisting of links and nodes. The structure defines a set of parent-child relationships. Parent nodes contain splitting rules that define the conditions under which a specific child is chosen. The rules consist of a splitting predictor, an operator, and one or more split values. For example, a rule might be IF AGE<=10 THEN Left Child ELSE Right Child. Another example is IF HAIR Color IN (Brown, Black) THEN Left Child ELSE Right Child. In addition, each node can contain ancillary information, such as a target value histogram, count of instances in the node, preferred target value at the node, or a ranked list of target values at the node.

Figure 1:
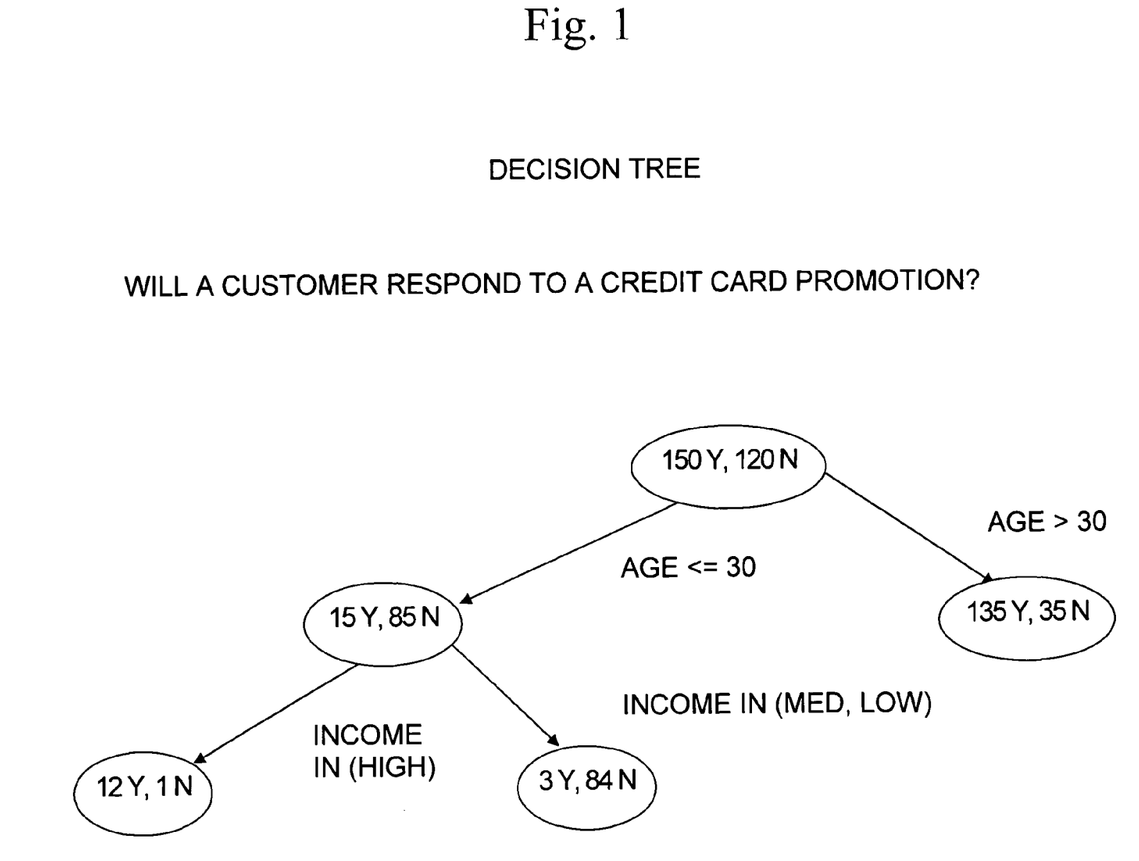
FIG. 1 illustrates an example of the application of a decision tree model.

An example of the application of a decision tree model is shown in FIG. 1. In this example, the decision tree models the response to a credit card promotion and may be used to provide a prediction as to the answer to the question "Will a customer respond to a credit card promotion?" In order to obtain the prediction, information relating to the particular customer may be used to traverse the tree by, at each node of the tree, using values of the customer's information to select a branch of the tree to follow. For example, the root of the tree, with no information about the customer, the prediction is that the customer is 56% (150 Y, 120 N) likely to respond to the promotion. If the customer's age is known, then if the age is greater than 30, the prediction is that the customer is 75% (135 Y, 35 N) likely to respond to the promotion. If the age is less than or equal to 30, the prediction is that the customer is 15% (15 Y, 85 N) likely to respond to the promotion. If the customer's income is also known, then the prediction can be further refined. If the customer's income is medium or low, then the prediction is that the customer is 3% (3 Y, 84 N) likely to respond to the promotion. If the customer's income is high, then the prediction is that the customer is 92% (12 Y, 1 N) likely to respond to the promotion. Thus, although it may not be worthwhile to target the credit card promotion to people under 30 in general; targeting the promotion to people under 30 with high incomes is worthwhile.

The present invention is particularly concerned with the generation of a decision tree model, such as that shown in FIG. 1. The present invention implements the functionality of generating a decision tree model in a database system. Preferably, the majority of the functionality is implemented via an internal SQL table function leveraging parallel recursion and bitmap indexes.

Figure 2:
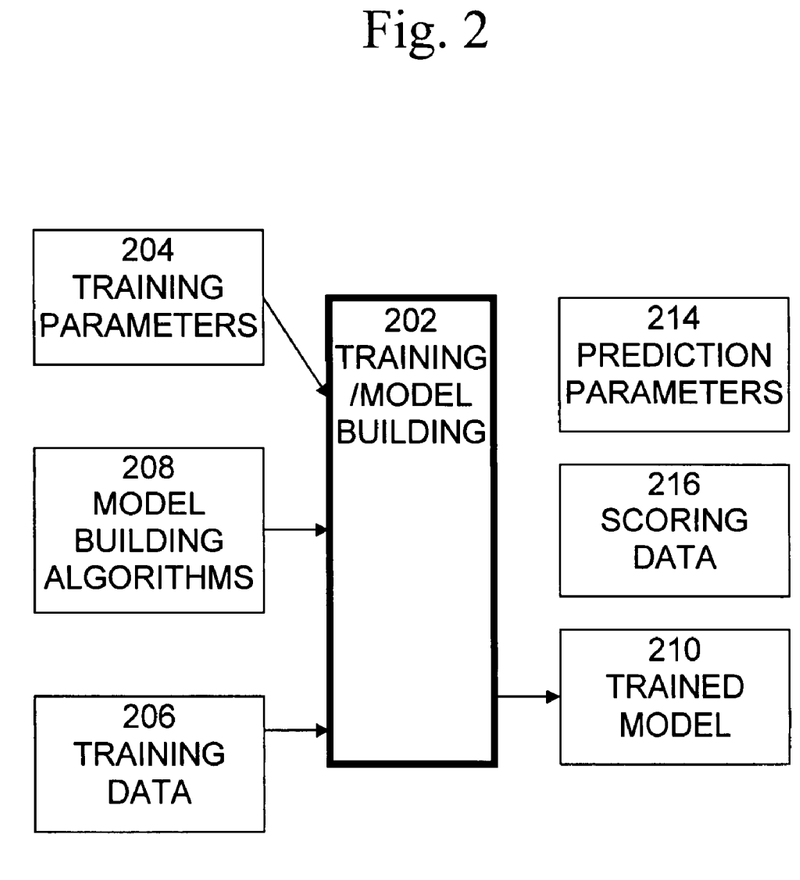
FIG. 2 is an exemplary data flow diagram of a process of building a decision tree model.

An exemplary data flow diagram of a process 200 of building a decision tree model, including building and scoring of models and generation of predictions/recommendations, is shown in FIG. 2. The training/model building step 202 involves generating the decision tree models that may be used to perform data mining recommendation and prediction. The inputs to training/model building step 202 include training parameters 204, training data 206, and model building algorithms 208. Model building algorithms 208 include algorithms that process the training data 206 in order to actually build the models. In particular, model building algorithms 208 includes decision tree algorithms that are used to build data mining models that are based on decision trees. Training parameters 204 are parameters that are input to the data-mining model building algorithms to control how the algorithms build the models. Training data 206 is data that is input to the algorithms and which is used to actually build the models.

Training/model building step 202 invokes the data mining model building algorithms included in model building algorithms 208, initializes the algorithms using the training parameters 204, processes training data 206 using the algorithms to build the model, and generates trained model 210. Trained model 210 includes representations of the decision tree model. Trained model 210 may also be evaluated and adjusted in order to improve the quality, i.e. prediction accuracy, of the model. Trained model 210 is then encoded in an appropriate format and deployed for use in making predictions or recommendations.

In the present invention, the bulk of the model building algorithms 208 are implemented in the form of a new decision tree table function. The input to this function is training data 206 in the form of a set of rows containing predictors (like age, gender, etc.) and a categorical target (perhaps income_level). Each row contains all of the information for a particular case. In addition, the table function has other inputs, such as training parameters 204, to help guide the tree build process (e.g., max tree depth).

Figure 3:
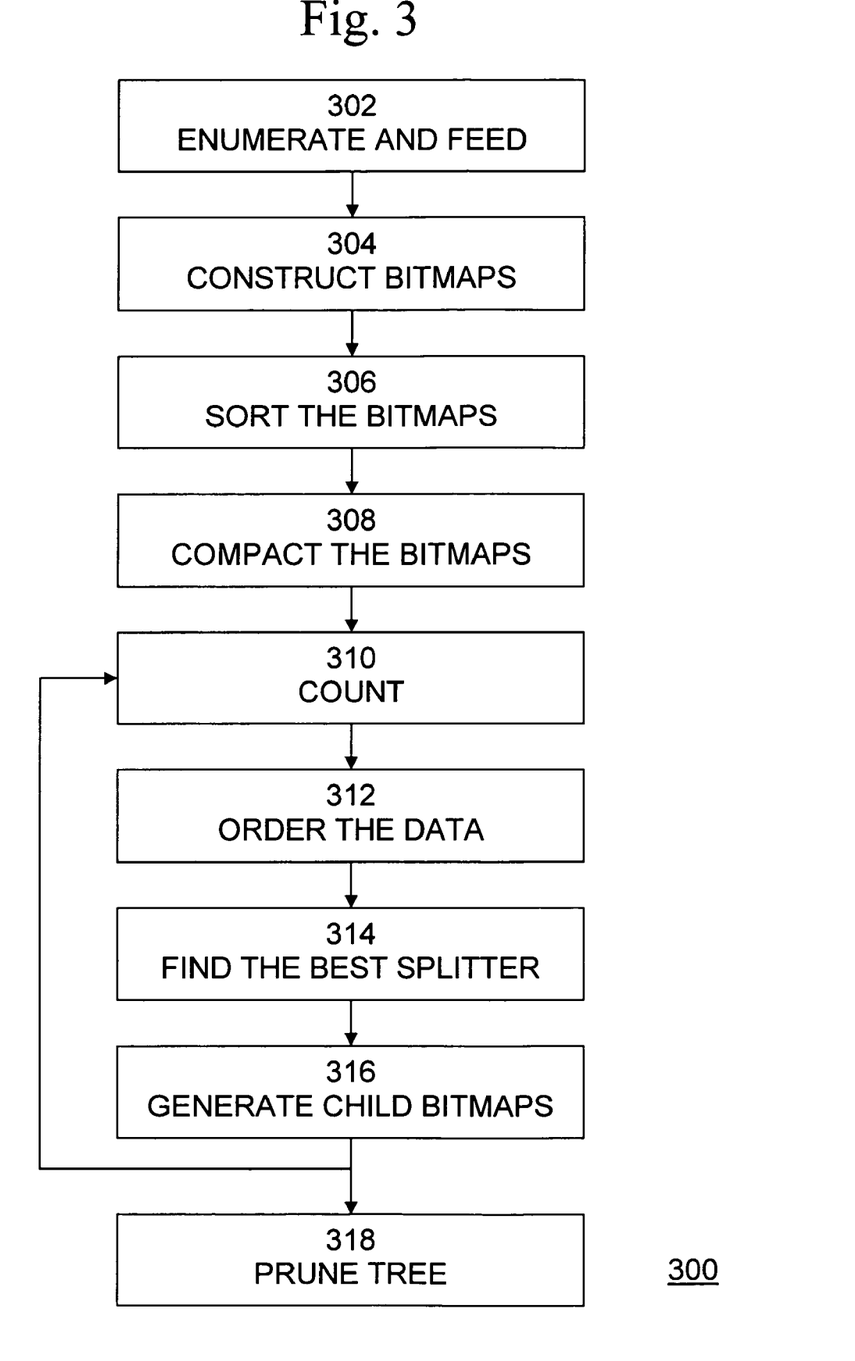
FIG. 3 is an exemplary flow diagram of a process of in-database building of a decision tree model.

A process 300 of in-database building of a decision tree model, such as that performed in step 202 of FIG. 2, is shown in FIG. 3. Process 300 begins with step 302, enumerate and feed, in which data is taken from normal rows in database tables and prepared for bitmap construction.

Figure 4:
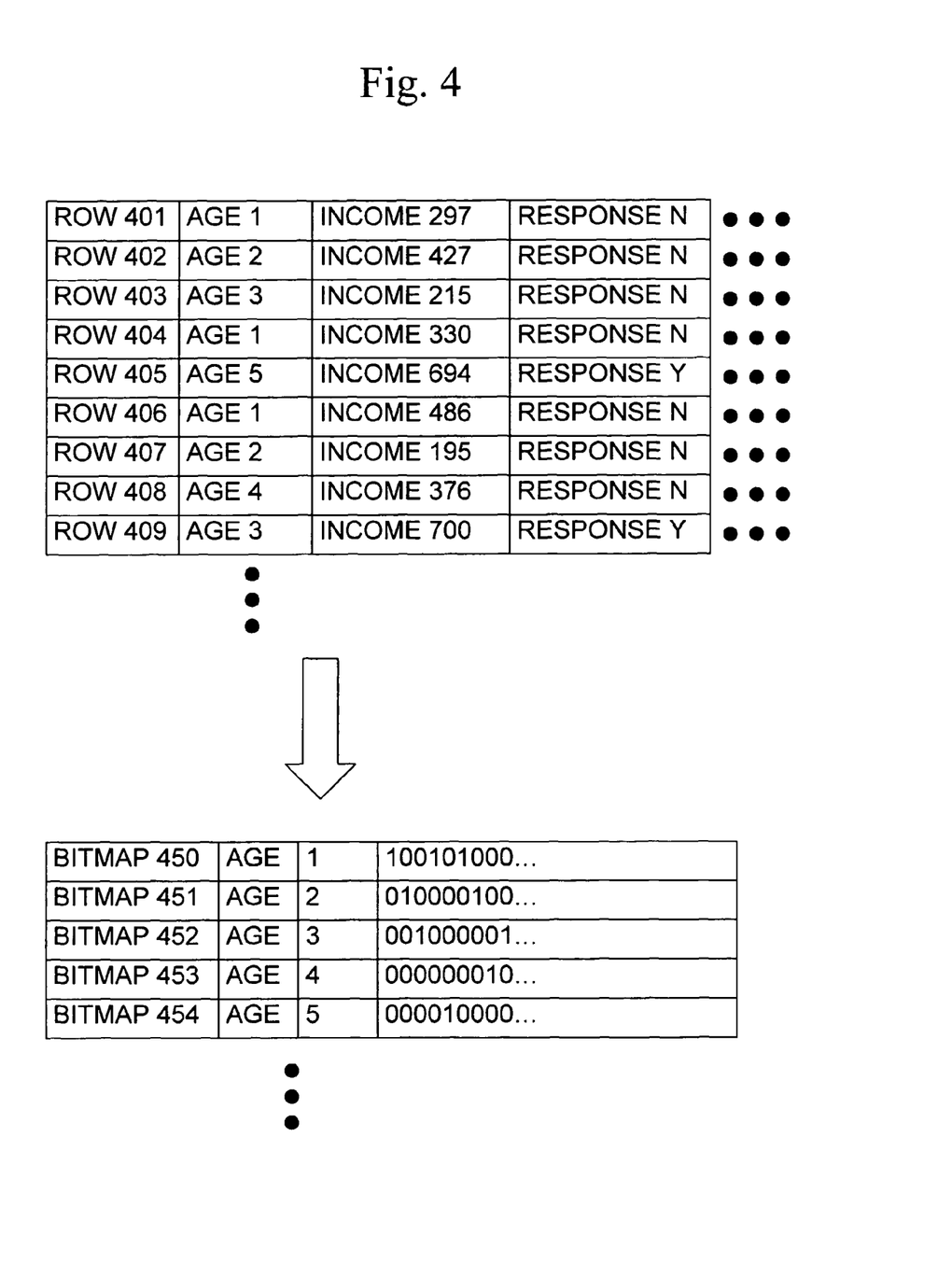
FIG. 4 is an exemplary illustration of construction of bitmaps from rows of data.

In step 304, the bitmaps are constructed. In order to construct the bitmaps, the incoming rows of data are numbered, then a bitmap is constructed for each unique value of each predictor and target that indicates whether or not that unique value of each predictor and target is present in that row. An example of this is shown in FIG. 4. As shown in FIG. 4, a plurality of rows 401-409, etc., include a plurality of values of predictors, such as age and income, as well as one or more targets, such as their response to a promotion. A bitmap 450 is constructed for age 1 that indicates whether or not the value 1 of the predictor age is present in each row 401-409, etc. Likewise, bitmaps 451-454 are constructed for other ages, and indicate whether or not their value of the predictor age is present in each row 401-409, etc. In addition, bitmaps for other predictors, such as income, etc., and for the targets, such as response, are constructed.

In step 306, the bitmaps are sorted by predictor and predictor value and target and target value, which may improve performance of the decision tree generation process, as well as the quality of the decision tree. In step 308, the sorted bitmaps are compacted, which also may improve performance of the decision tree generation process.

In step 310, once the compacted bitmaps are available, the counts of predictor-target pairs are generated. Preferably, this is done by intersecting a predictor bitmap with a target bitmap and summing the resulting bits. For example, the number of males with low income can be counted by intersecting the bitmaps for (gender, m) and (income_level, low) and counting the resulting intersections—rows where both the predictor value and target value are present.

In step 312 the resulting training data is ordered. Preferably, the ordering depends upon the type of data being processed. For example, for numerical data, the data is preferably ordered by predictor value, while for categorical data, the data is preferably ordered by target density.

In step 314, the counts generated in step 310 are used to determine, initially, for the root node, which predictor is the best splitter and where the split should occur. The splitting process of step 314 takes the raw predictor-target counts (per node) and computes the best split, preferably using an impurity metric, such as the Gini impurity metric or the entropy impurity metric. For example, the Gini impurity metric may be defined as:

a. $1-\text{SUM}(p(j|t)^2)$ over all target classes j,
b. $p(j|t)=p(j,t)/p(t)=p(j,t)/\text{SUM}(p(j,t))$,
c. $p(j,t)=P(j)*Nj(t)/Nj$, where P(j) is the (altered) prior probability of class j, Nj(t) is the number of records of class j in node t, and Nj is the number of records of class j in whole training set.

It is to be noted that splitting considerations vary with the type of data to be split. For example, for Numerical predictors, possible split points are along predictor value order (range splits). For categorical predictors with binary targets, possible split points lie along sorted order of target density (class1cnt/(class1cnt+class2cnt)). For categorical predictors with multi-class targets, it is preferably to use "twoing", that is, to arbitrarily group target classes into two "super" classes, use the regular approach for categoricals as above, and reassign targets to groups based on node dominance and repeat.

In step 316, the bitmaps for each child node generated by the split is generated. Once the best split is determined in step 314, the split information is fed to step 316, so that the node bitmaps for the next level can be generated. In addition, it sends the best split information is sent to the pruning step 318 for further processing. The splitting step may also generate surrogate splits and target histograms, if desired.

Process 300 then loops back to step 310 in order to recursively perform steps 310-314 on each child node of the tree as the tree is split. The tree is built in a breadth-first manner. First, the root split is determined. Once this is done, the root's two child node bitmaps are generated and the best splits for those two children are determined. Once this is done, the process moves to the third level, and so on.

It is to be noted that step 312 is among the steps that are repeated. As described above, the ordering performed by this step depends upon the type of data being processed. For example, for numerical data, the data is preferably ordered by predictor value, while for categorical data, the data is preferably ordered by target density. When the process sees a predictor name change, the data is pulled out of the sort and each split point is evaluated using an impurity metric. The best split point determined this way is preserved and compared to the previous best predictor split. When the process has finished with a set of nodes, it returns the best splits found.

In step 318 the tree is pruned by walking the decision tree and using a Minimum Description Length (MDL) based pruning approach to trim off leaves and branches. The pruned tree is then output from process 300. The main purpose of pruning is to take the built tree and prune so that it is general (not over-trained). In addition during the pruning phase nodes are renumbered so that branch nodes start with 0 and are contiguous and extra splits and surrogates are eliminated. Inputs to the pruning process include a set of rows that are output from the build process, using an encoding. These basic row vectors are:

Class total rows (node target histogram); if splitnumber is null
    Main split; if splitnumber=0 or
    Surrogate splits; if splitnumber>0
    Special rows are:
    Split predictor cardinality (for split cost); if splitnumber<0
    Binning rows (to unmap bin values); if both node and parent node are null
    Predictor counts (for split cost); if node parent node, and splitnumber are all=0 or
    Target class cardinality (for node cost); if node and parent node=0, and splitnumber !=0
    Pruning processing includes:
    Checking for row type based on encoding
    Putting binning information in a hash table
    Splitting the buffers (main and surrogate) and histogram rows
    Discarding extraneous splits (main and surrogate)
    Storing split and node cost information in a tree
    Taking the costs tree (segmented array) and walking it recursively
    Comparing node depth to a pre-defined maximum value
    Comparing the cost of representing the node split including both child target histograms, encoding the split information (predictor and split values), +1 for node structure to the parent target histogram
    Marking prune points as leaves for playback
    After consuming all rows and invoking prune, it then walks the buffered rows
    For each row, look up in the segmented array to determine if the node was pruned
    If not pruned away, grab the new node number and output the row (exploding to cover all bins for categorical binning)

In order to produce a split for a given predictor of a given node and provide a measure of "goodness" for the split, it is preferred that a single process have all of the predictor-target counts for that predictor for that node. This is not strictly necessary, but reduces implementation complexity significantly.

Figure 5:
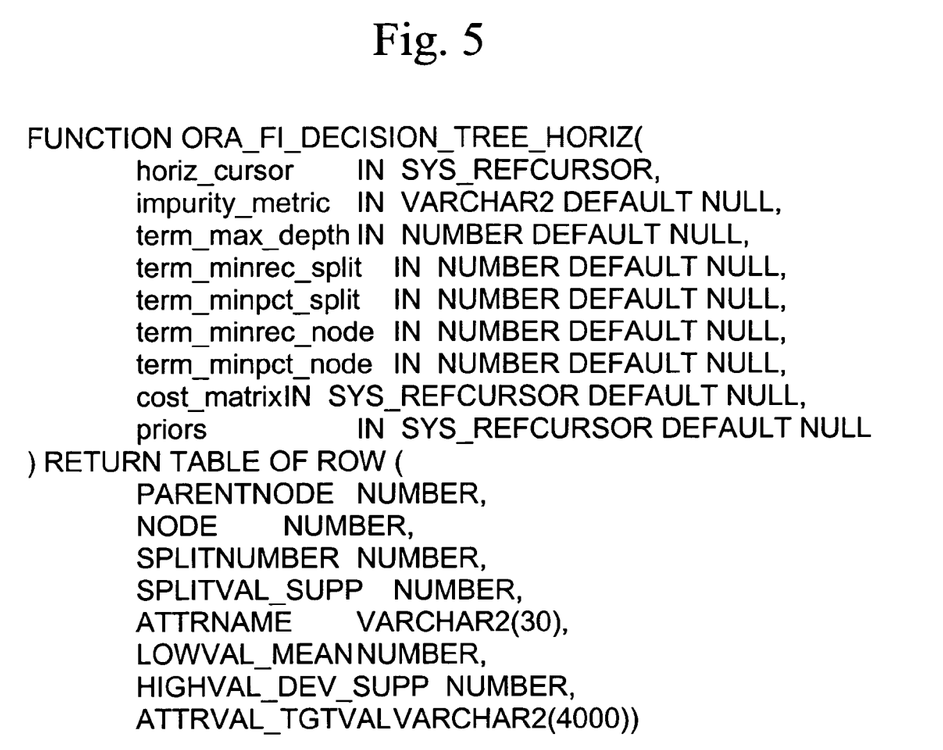
FIG. 5 is an example of an interface defining an SQL statement that invokes in-database generation of a decision tree model.
Figure 6:
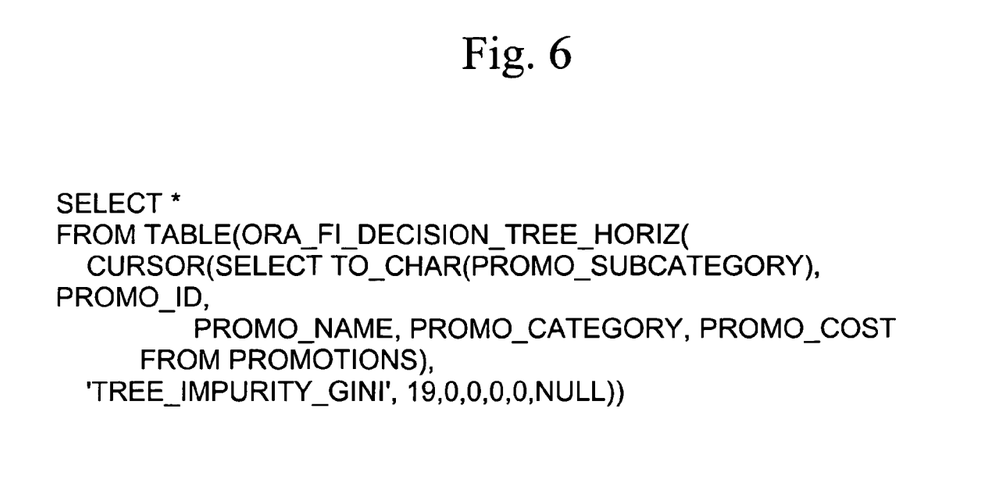
FIG. 6 is an example of the use of an SQL statement, such as that defined in FIG. 5, which invokes in-database generation of a decision tree model.
Figure 7:
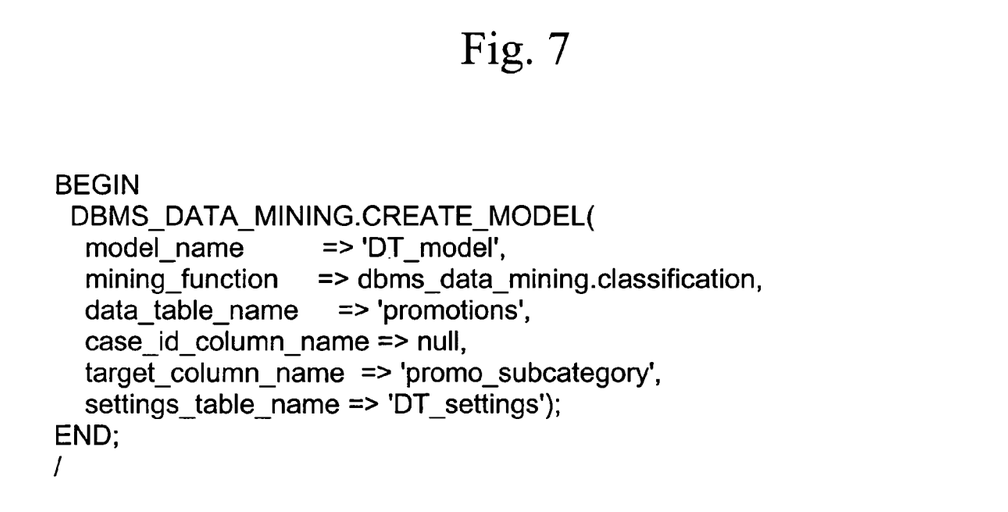
FIG. 7 is an example of a PL/SQL API through which an SQL statement, such as that shown in FIG. 6, is invoked.

An exemplary interface defining an SQL statement that invokes in-database generation of a decision tree model is shown in FIG. 5. The SQL statement defined by this interface is labeled ORA_FI_DECISION_TREE_HORIZ. An example of the use of this statement in SQL code is shown in FIG. 6. Typically, users would invoke the SQL code shown in FIG. 6 through a PL/SQL API, an example of which is shown in FIG. 7.

Figure 8:
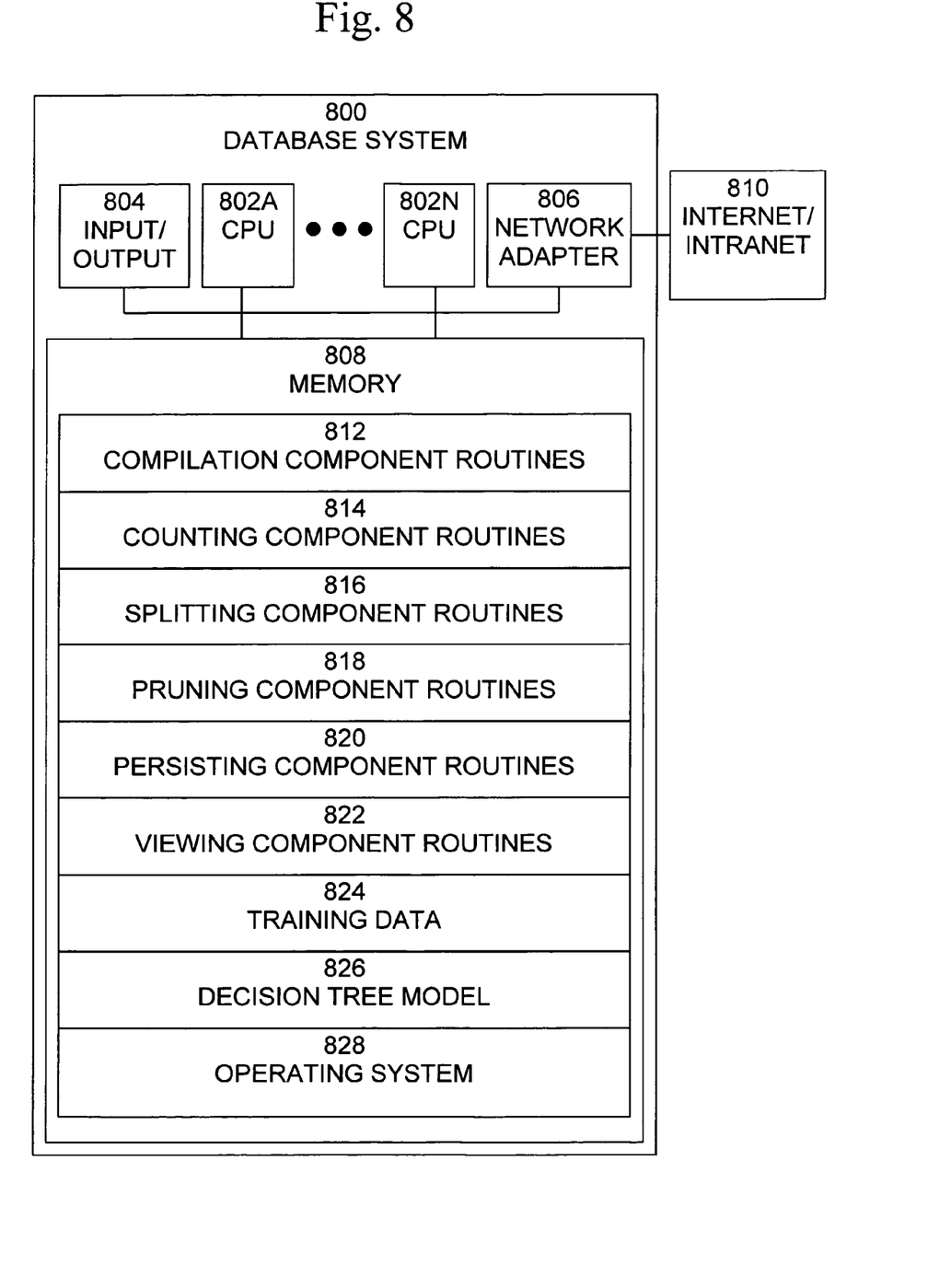
FIG. 8 is an exemplary block diagram of a database system, in which the present invention may be implemented.

An exemplary block diagram of a database system 800, in which the present invention may be implemented, is shown in FIG. 8. Database system 800 is typically a programmed general-purpose computer system, such as a personal computer, workstation, server system, and minicomputer or mainframe computer. Database system 800 includes one or more processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which database system 800 is implemented as a single multi-processor computer system, in which multiple processors 802A-802N share system resources, such as memory 808, input/output circuitry 804, and network adapter 806. However, the present invention also contemplates embodiments in which database system 800 is implemented as a plurality of networked computer systems, which may be single-processor computer systems, multi-processor computer systems, or a mix thereof.

Input/output circuitry 804 provides the capability to input data to, or output data from, database system 800. For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces database system 800 with Internet/intranet 810. Internet/intranet 810 may include one or more standard local area network (LAN) or wide area network (WAN), such as Ethernet, Token Ring, the Internet, or a private or proprietary LAN/WAN.

Memory 808 stores program instructions that are executed by, and data that are used and processed by, CPU 802 to perform the functions of database system 800. Memory 808 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 8, memory 808 includes compilation component routines 812, counting component routines 814, splitting component routines 816, pruning component routines 818, persisting component routines 820, viewing component routines 822, training data 824, decision tree model 826, and operating system 828. Compilation component routines 812 compile the SQL table function and perform the enumerate and feed functions, in which data is taken from normal rows in database tables and prepared for bitmap construction by building a row source tree. Counting component routines 814 generate the bitmaps (predictor, target, and node), intersect the bitmaps, and count the results. Splitting component routines 816 find the best split and surrogates for each node. Pruning component routines 818 prune the resulting tree. Persisting component routines take the output of the table function and produce a data mining model, decision tree model 826, and model tables to hold this information. Viewing component routines 822 take a built model and return its details. Training data 824 is data used by the routines to generate the decision tree model. Operating system 828 provides overall system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 9:
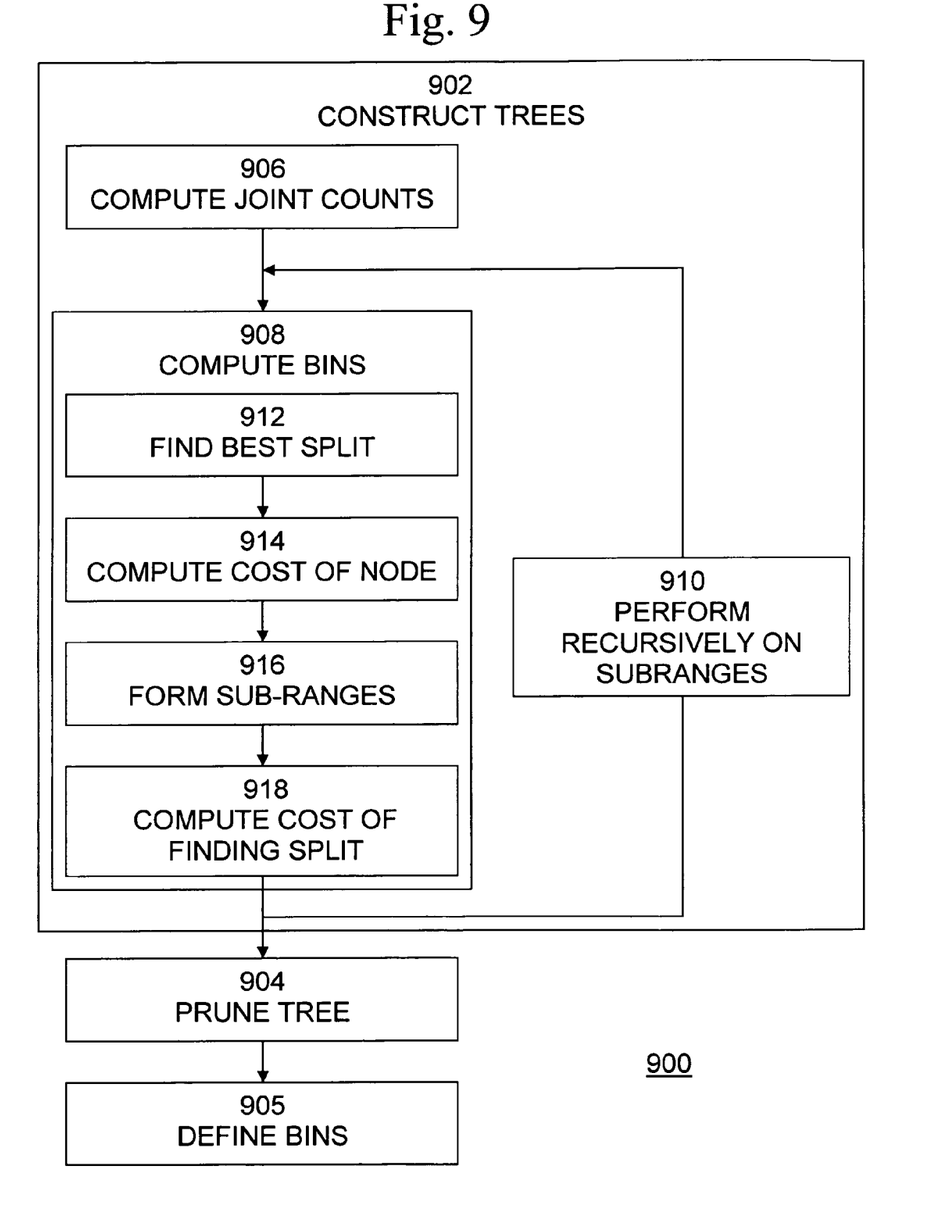
FIG. 9 is an exemplary flow diagram of a portion of a process of binning predictor values.
Figure 10:
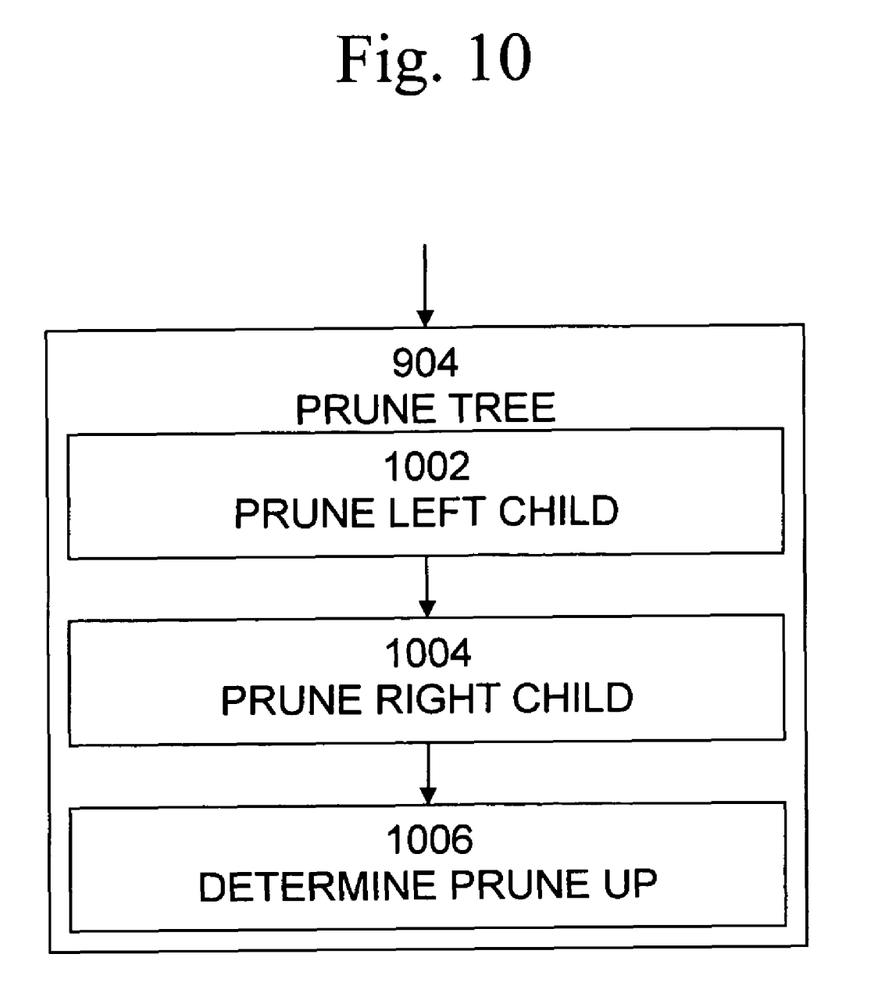
FIG. 10 is an exemplary flow diagram of a portion of a process of binning predictor values.

An example of a binning process 900 is shown in FIGS. 9 and 10. Process 900 provides a method for addressing the problems of noisy or irrelevant predictors and high-cardinality predictors in a unified manner. At a high level, the method can be broken down as follows:

In step 902, per-predictor binary trees are constructed by successively splitting the (sub-) range at the point of lowest Gini index. In step 904, the per-predictor trees thus built are pruned through application of the MDL principle via a composite code including tree structure components and, the Szpankowski approximation to the stochastic complexity of the target values at each leaf node. The data for classification trees are the set of target values in the training set. The model class consists of the set of target conditional probabilities at the tree leaves. Preferably, the Szpankowski approximation is used for computing the node costs. The stochastic complexity of a dataset is the shortest possible length for the data using a fixed model class. Modern versions of stochastic complexity include the normalized maximum likelihood, which is a universal approximation of the probability for all possible data for all models in the model class that achieves minimax redundancy. The Szpankowski approximation to the redundancy rate of memoryless sources can be used as the basis for a normalized maximum likelihood (NML) criterion description length of the target distribution at a node. For the parent node, the cost is simply the stochastic complexity (computed via the Szpankowski approximation) of the target distribution plus 1 bit for representing the parent node in the tree. The split is encoded as the sum of the stochastic complexities of the target distributions in the child nodes; plus an encoding of the predictor requiring log base 2 of the number of predictors; plus an encoding of the split value requiring either log base 2 of the number of unique values minus 1 or log base 2 of 2 to the power of the number of categories minus 1; plus 3 bits for representing the parent plus the two child nodes in the tree. If the cost of the split is greater than the cost of the parent, then the split is pruned. The values of the predictor may be numerical values or categorical values. For purposes of computing tree structure cost components, the unique values of numerical or categorical predictors are those that exist in the training data.

In step 905, the bins are defined. The leaves of the binary tree which has been pruned represent sub-ranges or sub-sets of the predictor values and form the bins.

These steps may be described in greater detail. In step 902, the per-predictor binary trees are constructed by, in step 906, computing joint counts of predictor and target values, in step 908, computing the bins, and in step 910, recursively performing binning step 908 on the subranges of the tree.

In step 906, prior to the binning step 908, joint counts of predictor and target values are computed. For example, if a predictor AGE takes values 15, 17, 20, 23, 28, 34, 45, 67, 68 and the target attribute takes values yes or no, counts of all records with AGE=15 and target=yes, AGE=15 and target=no, AGE=17 and target=no, and so on, are computed. Given these counts, in step 901, binning step 908 is recursively performed.

Binning step 908 includes steps 912-918 and accepts as an input a range or set of predictor values. In step 908, all possible splits in the range (or set of values) specified are evaluated and the best split point is found. The best split point, for example, is the one that has the lowest Gini index value. The Gini index is defined as Gini=1−sum(pj*pj) where pj is the probability of target class j (yes or no in our example) given the split point being evaluated. If this branch cannot be split any further, binning for this branch is complete. Otherwise, in step 914, the cost of representing this node in the tree is computed and stored. This cost is stored for every node. In step 916, if a split point was found, the range or sub-range (set or subset for categorical predictors) is split to form two sub-ranges (or sub-sets for categorical predictors) are constructed using the split point. In step 918, the cost of finding the split point is computed. For example, for numerical predictors the cost is log (n−1) whereas for categorical predictors it is log (2^n−1); n being the cardinality of the predictor in question. The split cost at each node is stored. In step 910, step 908 is performed recursively successively on both the sub-ranges (or sub-sets) that were found in step 908.

At the completion of step 902, a one-predictor binary tree has been constructed. At each branch node is a splitting criterion on the predictor in question (like AGE<=18 or STATE IN (MA, RI, CT) etc.). At the leaves of the tree, there is a sub-range or subset of the values of the predictor that cannot be split any further and can form bins for the predictor values. However, it is preferred to prune back the trees thus built in step 904. This allows the cost of having added granularity in the predictor values to be balanced with the computational complexity and the cost of representing the model (loosely speaking).

An example of a pruning process performed by prune tree step 904, in which the constructed per-predictor trees are pruned, is shown in FIG. 10. In step 1002, the pruning process is recursively performed on the left child of the node that has been split. In step 1004, the pruning process is recursively performed on the right child of the node that has been split. In step 1006, it is determined whether the process should prune up to the current node. The cost of not pruning is the cost of the two sub-trees plus the cost to represent the split at the current node. If this is greater than the cost of representing this node or the tree exceeds a predefined depth, which was computed in step 914, shown in FIG. 9, then the process will prune up to the current node.

At the completion of prune tree step 904, the result will be a one-predictor binary tree which has been pruned. In step 905, the bins are defined. The leaves of the binary tree which has been pruned represent sub-ranges or sub-sets of the predictor values and form the bins. Some trees might get pruned away completely in this process. This means that the predictor in question has little if any information about the target attribute and need not be considered during subsequent modeling. The net result of this process is that the predictors are binned, thus reducing their cardinality. At the same time, the noisy or irrelevant predictors are also removed. Subsequent modeling may use these binned predictors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of generating a decision tree model in a computer system comprising a processor, a memory, and computer program instructions, which when executed by the processor perform the method comprising:
    generating a plurality of bitmaps in a database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table;
    constructing a binary tree for a predictor that splits the values of the predictor into a plurality of portions, pruning the binary tree, defining as bins of the predictor leaves of the tree that remain after pruning, each leaf of the tree representing a portion of the values of the predictor, binning the predictor using the defined bins by replacing the portion of the values of the predictor represented by each leaf of the tree with a bin so as to reduce a cardinality of the predictor by reducing a number of distinct values of the predictor to a number of the bins;
    counting predictor-target pairs for each combination of binned predictor value and target value using the bitmaps;
    determining a splitter value for the data in the database table using the counts of the predictor-target pairs so as to split the data in the database table into a plurality of child nodes, each child node comprising a portion of the data in the database table;
    generating child bitmaps for the data in each child node; and
    recursively counting predictor-target pairs for each child node using the bitmaps, determining a splitter value for the data in each child node so as to split each child node into a plurality of new child nodes, and generating child bitmaps for the data in each new child node;
    whereby a decision tree model is formed including the predictor using the defined bins to reduce the cardinality of the predictor to the number of distinct values equal to the number of the bins in the decision tree model.

2. The method of claim 1, wherein the binary tree is constructed by recursively:
    computing joint counts of predictor and target values;
    finding a split point for a node for a portion of the values of the predictor;
    computing a cost of representing the split node in the tree;
    splitting the portion of the values of the predictor to form two new portions of the values of the predictor; and
    computing a cost of finding the split.

3. The method of claim 2, wherein the tree is pruned by, for each child of each split node of the tree, recursively:
    determining a cost of not pruning the tree up to the split node as a cost to represent sub-trees of the split node plus a cost to represent the split node; and
    pruning the tree up to the split node if the cost of not pruning the tree up to the split node is greater than a cost of representing the split node in the tree or the tree exceeds a predefined depth or contains more than a predefined number of nodes.

4. The method of claim 3, wherein the split point is at a value of the predictor having a lowest Gini index value of the portion of the values of the predictor.

5. The method of claim 4, wherein a cost of representing the split node in the tree includes using a Szpankowski approximation to the normalized maximum likelihood criterion for representing the target histograms in the parent and child nodes.

6. The method of claim 1, wherein the decision tree model is pruned.

7. The method of claim 6, wherein the decision tree model is pruned by walking the decision tree model and using a Minimum Description Length based pruning approach to trim off leaves and branches of the decision tree model.

8. A system for generating a decision tree model comprising:
    a processor operable to execute computer program instructions;
    a memory operable to store computer program instructions executable by the processor; and
    computer program instructions stored in the memory and executable to perform the steps of:
    generating a plurality of bitmaps in a database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table;
    constructing a binary tree for a predictor that splits the values of the predictor into a plurality of portions, pruning the binary tree, defining as bins of the predictor leaves of the tree that remain after pruning, each leaf of the tree representing a portion of the values of the predictor, binning the predictor using the defined bins by replacing the portion of the values of the predictor represented by each leaf of the tree with a bin so as to reduce a cardinality of the predictor by reducing a number of distinct values of the predictor to a number of the bins;
    counting predictor-target pairs for each combination of binned predictor value and target value using the bitmaps;
    determining a splitter value for the data in the database table using the counts of the predictor-target pairs so as to split the data in the database table into a plurality of child nodes, each child node comprising a portion of the data in the database table;
    generating child bitmaps for the data in each child node; and recursively counting predictor-target pairs for each child node using the bitmaps, determining a splitter value for the data in each child node so as to split each child node into a plurality of new child nodes, and generating child bitmaps for the data in each new child node;

whereby a decision tree model is formed including the predictor using the defined bins to reduce the cardinality of the predictor to the number of distinct values equal to the number of the bins in the decision tree model.

9. The system of claim 8, wherein the binary tree is constructed by recursively:

computing joint counts of predictor and target values;
finding a split point for a node for a portion of the values of the predictor;
computing a cost of representing the split node in the tree;
splitting the portion of the values of the predictor to form two new portions of the values of the predictor; and
computing a cost of finding the split.

10. The system of claim 9, wherein the tree is pruned by, for each child of each split node of the tree, recursively:

determining a cost of not pruning the tree up to the split node as a cost to represent sub-trees of the split node plus a cost to represent the split node; and
pruning the tree up to the split node if the cost of not pruning the tree up to the split node is greater than a cost of representing the split node in the tree or the tree exceeds a predefined depth or contains more than a predefined number of nodes.

11. The system of claim 10, wherein the split point is at a value of the predictor having a lowest Gini index value of the portion of the values of the predictor.

12. The system of claim 11, wherein a cost of representing the target histograms in a split node of the tree is computed using a Szpankowski approximation to the normalized maximum likelihood criterion.

13. The system of claim 8, wherein the decision tree model is pruned.

14. The system of claim 13, wherein the decision tree model is pruned by walking the decision tree model and using a Minimum Description Length based pruning approach to trim off leaves and branches of the decision tree model.

15. A computer program product for generating a decision tree model comprising:

a non-transitory computer readable storage medium;
computer program instructions, recorded on the non-transitory computer readable storage medium, executable by a processor, for performing the steps of generating a plurality of bitmaps in a database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table;
constructing a binary tree for a predictor that splits the values of the predictor into a plurality of portions, pruning the binary tree, defining as bins of the predictor leaves of the tree that remain after pruning, each leaf of the tree representing a portion of the values of the predictor, binning the predictor using the defined bins by replacing the portion of the values of the predictor represented by each leaf of the tree with a bin so as to reduce a cardinality of the predictor by reducing a number of distinct values of the predictor to a number of the bins;
counting predictor-target pairs for each combination of binned predictor value and target value using the bitmaps;
determining a splitter value for the data in the database table using the counts of the predictor-target pairs so as to split the data in the database table into a plurality of child nodes, each child node comprising a portion of the data in the database table;
generating child bitmaps for the data in each child node; and
recursively counting predictor-target pairs for each child node using the bitmaps, determining a splitter value for the data in each child node so as to split each child node into a plurality of new child nodes, and generating child bitmaps for the data in each new child node;
whereby a decision tree model is formed including the predictor using the defined bins to reduce the cardinality of the predictor to the number of distinct values equal to the number of the bins in the decision tree model.

16. The computer program product of claim 15, wherein the binary tree is constructed by recursively:

computing joint counts of predictor and target values;
finding a split point for a node for a portion of the values of the predictor;
computing a cost of representing the split node in the tree;
splitting the portion of the values of the predictor to form two new portions of the values of the predictor; and
computing a cost of finding the split.

17. The computer program product of claim 16, wherein the tree is pruned by, for each child of each split node of the tree, recursively:

determining a cost of not pruning the tree up to the split node as a cost to represent sub-trees of the split node plus a cost to represent the split node; and
pruning the tree up to the split node if the cost of not pruning the tree up to the split node is greater than a cost of representing the split node in the tree or the tree exceeds a predefined depth or contains more than a predefined number of nodes.

18. The computer program product of claim 17, wherein the split point is at a value of the predictor having a lowest Gini index value of the portion of the values of the predictor.

19. The computer program product of claim 18, wherein a cost of representing the split node in the tree includes using a Szpankowski approximation to the normalized maximum likelihood criterion for representing the target histograms in the parent and child nodes.

20. The computer program product of claim 15, wherein the decision tree model is pruned.

21. The computer program product of claim 20, wherein the decision tree model is pruned by walking the decision tree model and using a Minimum Description Length based pruning approach to trim off leaves and branches of the decision tree model.

* * * * *